(12) United States Patent
Lim et al.

(10) Patent No.: US 10,630,132 B2
(45) Date of Patent: Apr. 21, 2020

(54) ROTOR AND MOTOR HAVING THE SAME

(71) Applicant: LG INNOTEK CO., LTD., Seoul (KR)

(72) Inventors: Hee Soo Lim, Seoul (KR); Jae Hyun Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 368 days.

(21) Appl. No.: 15/618,284

(22) Filed: Jun. 9, 2017

(65) Prior Publication Data

US 2017/0358963 A1  Dec. 14, 2017

(30) Foreign Application Priority Data

Jun. 13, 2016 (KR) .................. 10-2016-0073393

(51) Int. Cl.
*H02K 1/27* (2006.01)
*H02K 5/128* (2006.01)

(52) U.S. Cl.
CPC ............ *H02K 5/128* (2013.01); *H02K 1/278* (2013.01)

(58) Field of Classification Search
CPC ........ H02K 1/278; H02K 1/2706; H02K 1/28; H02K 5/128; B62D 5/04
See application file for complete search history.

(56) References Cited

U.S. PATENT DOCUMENTS

| 7,365,465 | B2* | 4/2008 | Ludwig | H02K 1/278 310/156.12 |
| 2014/0117802 | A1* | 5/2014 | Sugimoto | H02K 1/28 310/156.01 |
| 2016/0197527 | A1* | 7/2016 | Yamada | H02K 1/2706 310/156.21 |
| 2016/0319828 | A1* | 11/2016 | Song | F04D 13/0606 |
| 2017/0310176 | A1* | 10/2017 | Kawaguchi | H02K 1/278 |
| 2018/0258944 | A1* | 9/2018 | Diekmann | H02K 5/1285 |

* cited by examiner

*Primary Examiner* — Bernard Rojas
(74) *Attorney, Agent, or Firm* — KED & Associates, LLP

(57) ABSTRACT

A rotor and a motor having a rotor are provided. The rotor may include a rotor core, a cover provided on an upper part of the rotor core, a magnet provided on an outer circumferential surface of the rotor core, and a can member that accommodates the rotor core and the magnet therein and is coupled to the cover. The cover may include a groove formed in a circumferential direction with respect to the center of the cover and into which an edge of the can member may be inserted, and the edge of the can member may be inserted into the groove of the cover to be coupled to the cover. Therefore, use of an adhesive when the can member is coupled to the rotor core may be avoided.

16 Claims, 13 Drawing Sheets

ROTOR AND MOTOR HAVING THE SAME

CROSS-REFERENCE TO RELATED APPLICATION

This application claims priority under 35 U.S.C. § 119 to and the benefit of Korean Patent Application No. 10-2016-0073393, filed on Jun. 13, 2016, whose entire disclosure is incorporated herein by reference.

BACKGROUND

1. Field

A rotor and a motor having a rotor are provided.

2. Background

Electronic power steering (EPS) is an apparatus which may ensure cornering stability of a vehicle and may provide a fast restoration force to allow a driver to safely drive the vehicle. Such EPS drives a motor through an electronic control unit (ECU) according to driving conditions that may be detected by a vehicle speed sensor, a torque angle sensor, and a torque sensor, and controls driving of a steering axis of a vehicle.

A rotor of an EPS motor may include a magnet. The magnet may be attached to an outer circumferential surface of a rotor core. Due to structural characteristics of the motor, various protection methods, such as, e.g., molding, can, tube, may be applied to improve durability of an assembly of the magnet.

Among such protection methods, a can-type method, which protects a rotor by coupling a can having a cup shape to a top and bottom of an outer circumferential surface of the rotor and prevent deviation of a magnet, may be a common method. An adhesive may be applied inside the can to assemble the rotor to the inside of the can. However, a process of applying the adhesive may have a problem in that an assembly process of the rotor may become complicated. For example, there may be a problem in that evenly applying a certain amount of the adhesive on an adhesive part of the can and the rotor may be very difficult. If using two cans, there may be a problem in that a number of compartments and manufacturing costs may increase.

BRIEF DESCRIPTION OF THE DRAWINGS

The embodiments will be described in detail with reference to the following drawings in which like reference numerals refer to like elements wherein.

DETAILED DESCRIPTION

Figure 1:
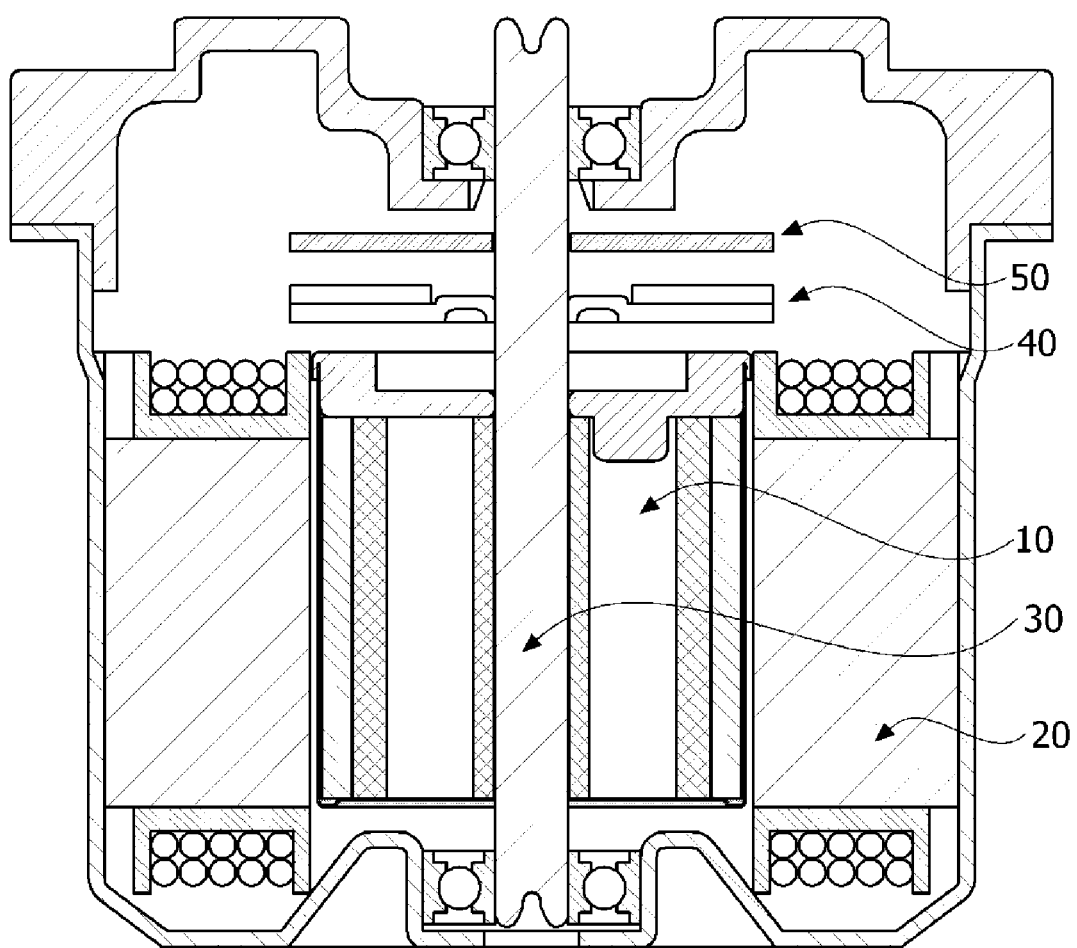
FIG. 1 is a view illustrating a motor according to the present disclosure.

Referring to FIG. 1, a motor according to the embodiment may include a rotor 10, a stator 20, a rotating shaft 30, and a sensing part 40. The rotor 10 may rotate through an electrical interaction with the stator 20. Coils may be wound around the stator 20 to induce the electrical interaction with the rotor 10.

The stator 20 may include a stator core including a plurality of stator teeth. The stator core may be provided with a ring-shaped yoke part and teeth around which the coils may be wound in a direction toward a center from the yoke. The stator teeth may be provided along an outer circumferential surface of the yoke part at a predetermined interval. The stator core may be formed by a plurality of thin steel plate-shaped plates stacked on each other. The stator core may be formed by a plurality of divided cores which are combined or connected to each other. An insulator may be coupled to the stator teeth and may insulate the coils from the stator core to prevent flow of a current therebetween.

The rotating shaft 30 may be coupled to the rotor 10. When a supply of current causes an electromagnetic interaction between the rotor 10 and the stator 20, the rotor 10 may rotate and the rotating shaft 30, which may be interlocked with the rotor, may be rotated. The rotating shaft 30 may be connected to a steering shaft of a vehicle and may deliver a driving force to the steering shaft. The rotating shaft 30 may be supported by a bearing.

The sensing part 40 may be a device coupled to the rotating shaft 30 to be interlocked with the rotor 10 and to detect a location of the rotor 10. The sensing part 40 may include a sensing magnet and a sensing plate. The sensing magnet and the sensing plate may be coupled to each other to have the same axis, and the sensing magnet may be provided on an upper side of the sensing plate.

A sensor to detect a magnetic force of the sensing magnet may be provided on a printed circuit board 50. The sensor may be a Hall IC. The sensor may detects change in an N pole and an S pole of a main magnet or a submagnet and may generate a sensing signal. The printed circuit board 50 may be coupled to a lower surface of a cover of a housing and may be installed on the sensing magnet such that the sensor faces the sensing magnet.

The rotor 10 may include a rotor core and a magnet coupled to the rotor core. The rotor 10 may be implemented as one of various types depending on combinations of the rotor core and the magnet. Among the various types of rotor, the motor may include a type of rotor in which a magnet is coupled to an outer circumferential surface of a rotor core. For such a type of rotor 10, a separate can member may be coupled to the rotor core to prevent deviation of the magnet and increase a combining force therebetween.

Figure 2:
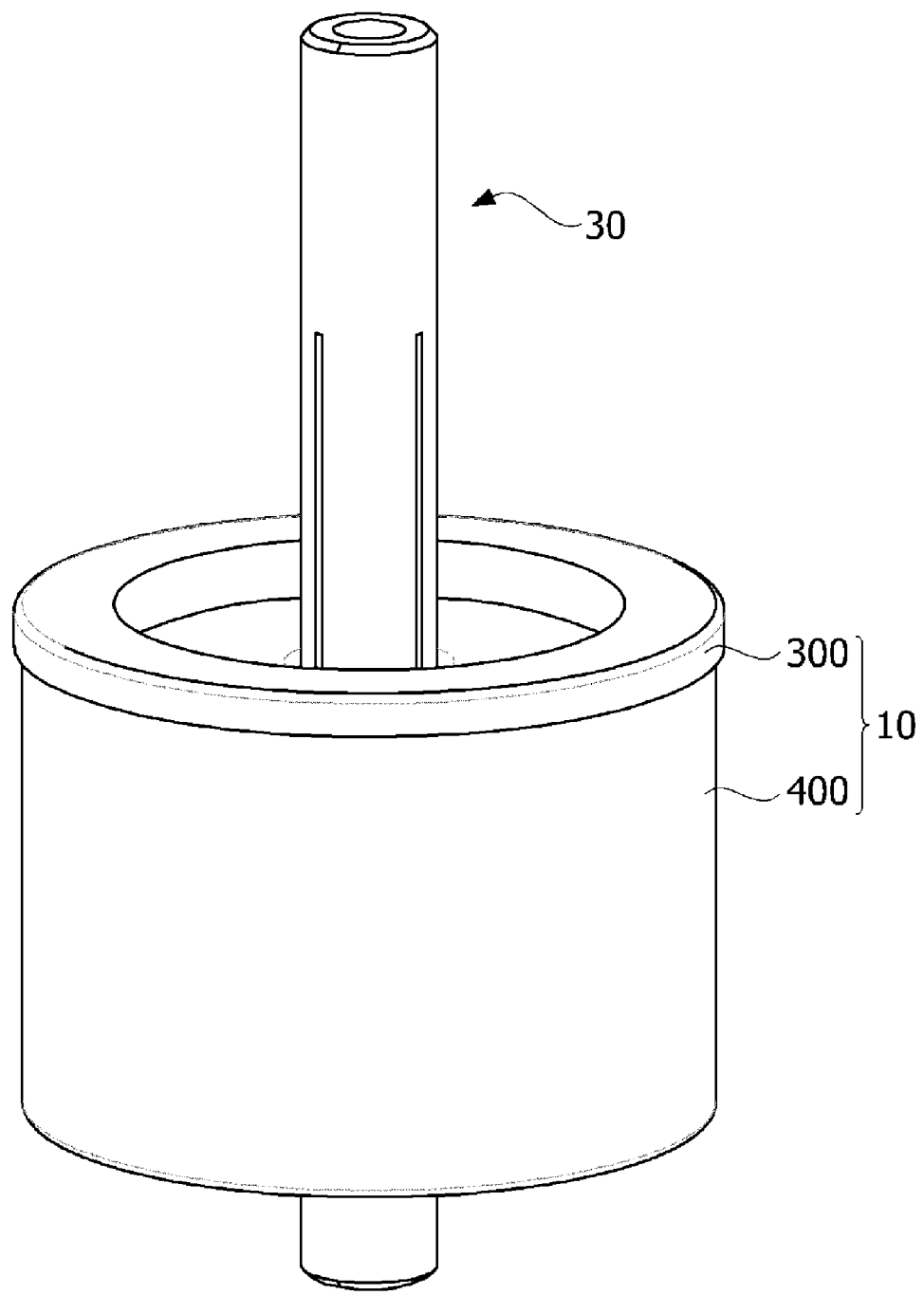
FIG. 2 is a view illustrating a rotor.
Figure 3:
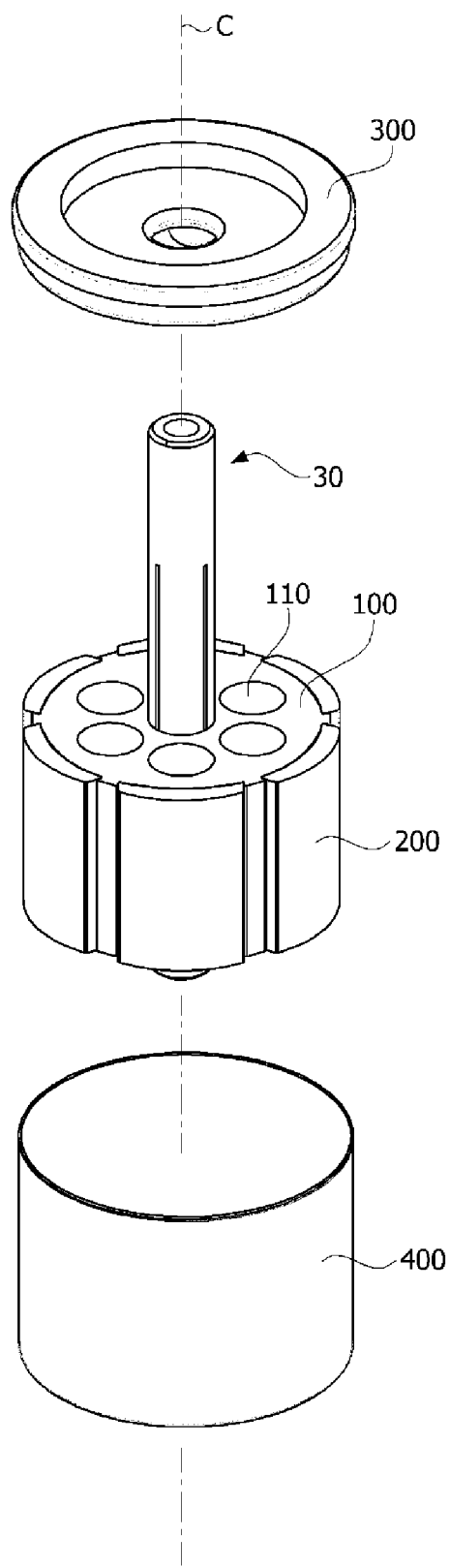
FIG. 3 is an exploded view illustrating the rotor shown in FIG. 2.

Referring to FIG. 2 and FIG. 3, the rotor 10 may include a rotor core 100, a magnet 200, a cover 300, and a can member 400. A center C of a vertical cross-section of the rotor core 100 cut to be perpendicular to the rotating shaft 30 with respect to the rotating shaft 30 may be considered to be the same as a center of a vertical cross-section of the can member 400 cut to be perpendicular to the rotating shaft 30.

The rotor core 100 may be formed in a shape in which a plurality of thin circular steel plate-shaped plates are stacked, or in a shape of one container. A hole to which the rotating shaft 30 may be coupled may be formed in the center of the rotor core 100. A protrusion may protrude from an outer circumferential surface of the rotor core 100 to guide the magnet 200. The magnet 200 may be attached to the outer circumferential surface of the rotor core 100. A plurality of the magnets 200 may be provided at a circumference of the rotor core 100 at a predetermined interval.

The cover 300 may be coupled to an upper surface or a lower surface of the rotor core 100. The cover 300 may be coupled to the can member 400 and may serve to fix the can member 400. The can member 400 may surround the magnet 200 so that the magnet 200 does not deviate from the rotor core 100. Further, the can member 400 may prevent exposure of the magnet 200 to an outside.

Figure 4:
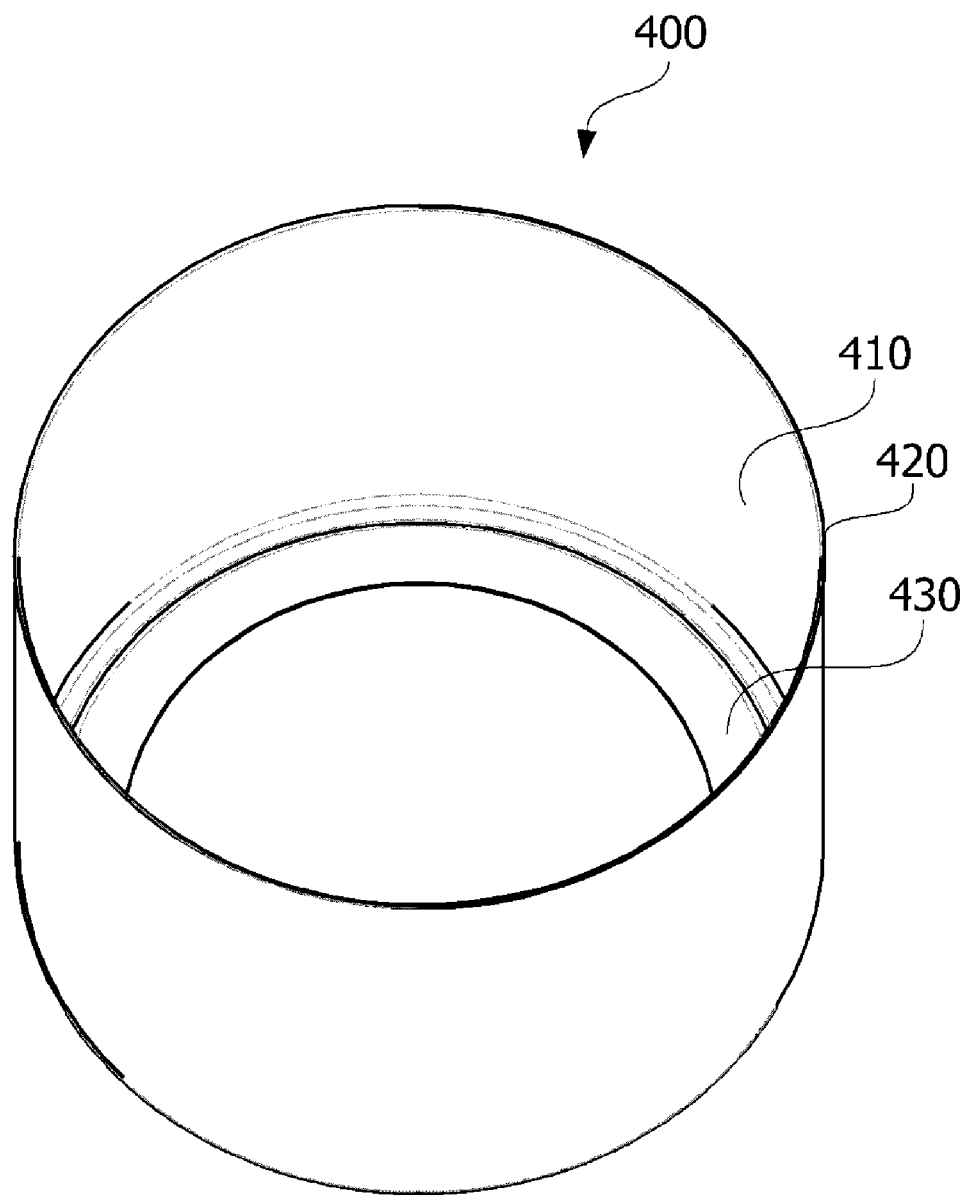
FIG. 4 is a perspective view illustrating a can member.
Figure 5:
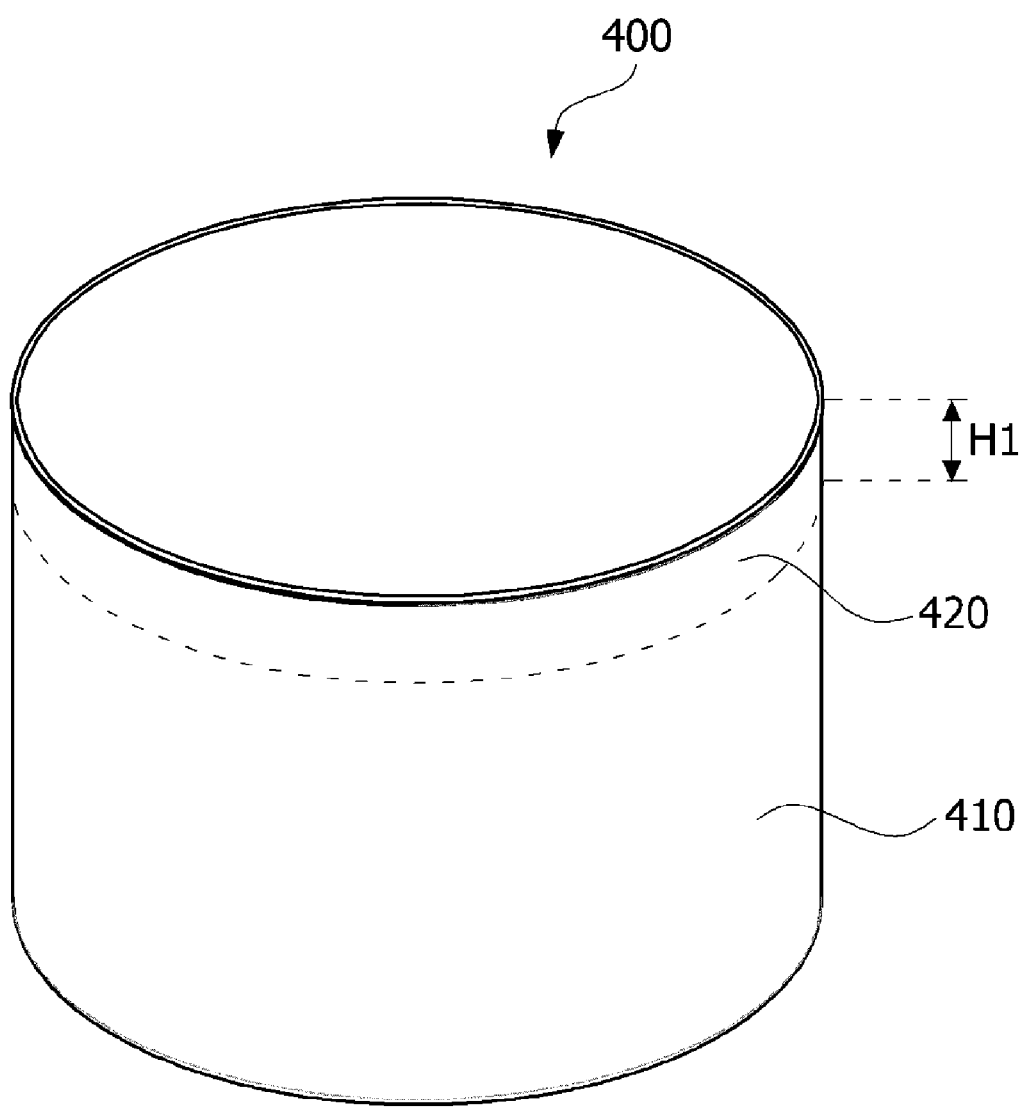
FIG. 5 is a view illustrating an insertion portion of the can member shown in FIG. 4.

Referring to FIG. 3 to FIG. 5, the can member 400 may include a can body 410, an insertion portion 420, and a flange part or flange 430. It should be noted that the body 410, the insertion portion 420, and the flange part 430 may be separately described according to only their shapes and functional characteristics, but they may form one connected configuration. The can member 400 may be formed of an aluminum material.

The body 410 may be formed in a cylindrical shape. An upper part and a lower part of the body 410 may be formed in an open shape. The rotor core 100 may be provided inside the body 410. The body 410 may surround the magnet 200.

The insertion portion 420 may be coupled to the cover 300 and may fix the can member 400 to the rotor core 100. The insertion portion 420 may be implemented in a shape in which an edge of an upper end of the body 410 is extended. The insertion portion 420 may be formed to extend a predetermined length H1 from the edge of the upper end of the body 410. Thus, it may not be necessary to manufacture and implement an individual coupling structure to couple with the cover 300. The insertion portion 420 may be an extended configuration of the body 410 in the cylindrical shape, and thus manufacture of the can member 400 may be facilitated and manufacturing processes thereof may be reduced.

The length H1 of the insertion portion 420 may be set in consideration of a length of a groove 330 (refer to FIG. 8) of the cover 300. The flange part 430 may be formed at an edge of a lower end of the body 410. For example, the flange part 430 may extend from the edge of the lower end of the body 410 and may be formed to be curved toward the center C of the can member 400. The flange part 430 may be provided at a lower side of the rotor core 100.

Figure 6:
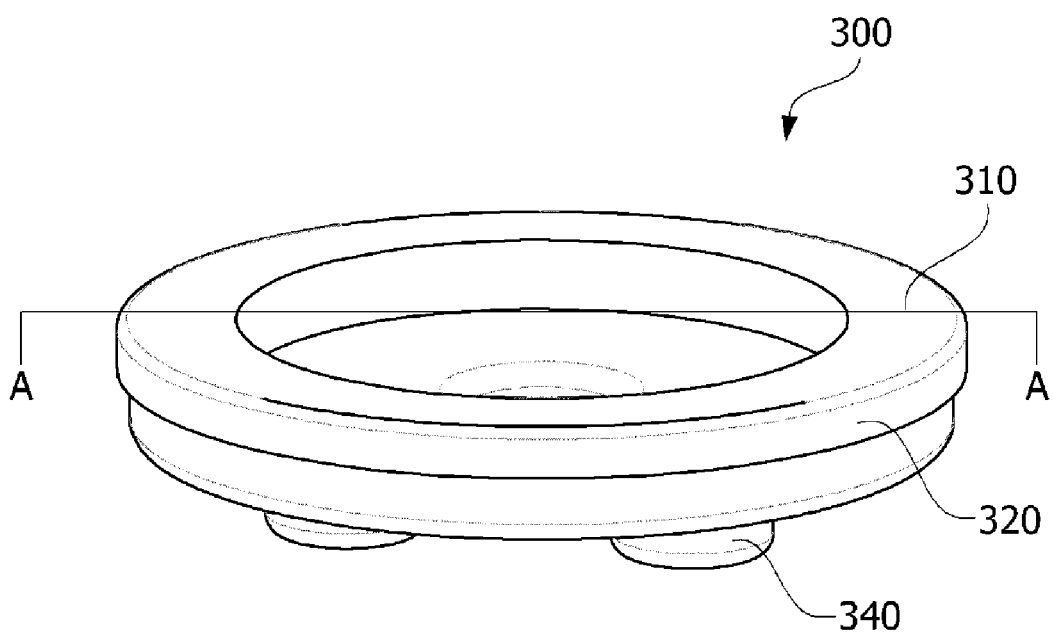
FIG. 6 is a view illustrating a cover.
Figure 7:
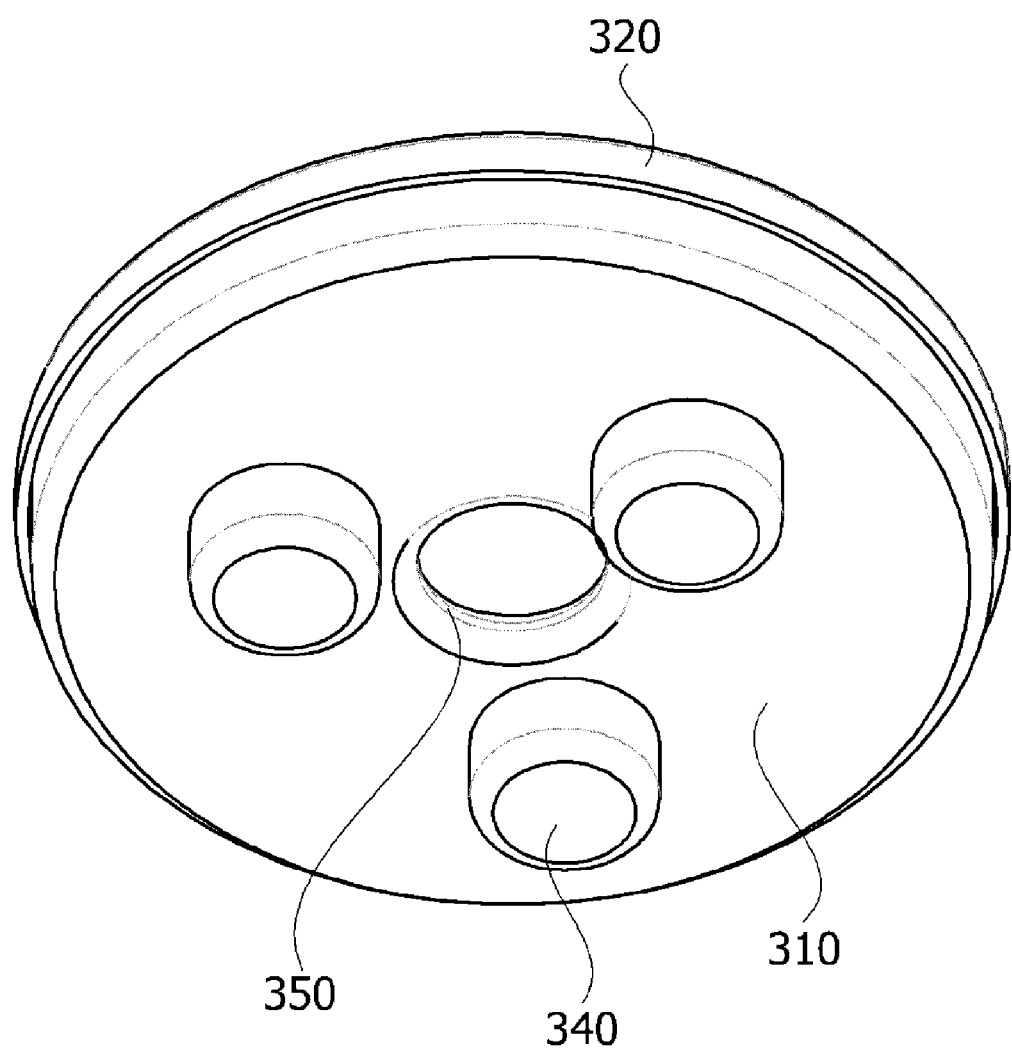
FIG. 7 is a bottom view illustrating the cover shown in FIG. 6.
Figure 8:
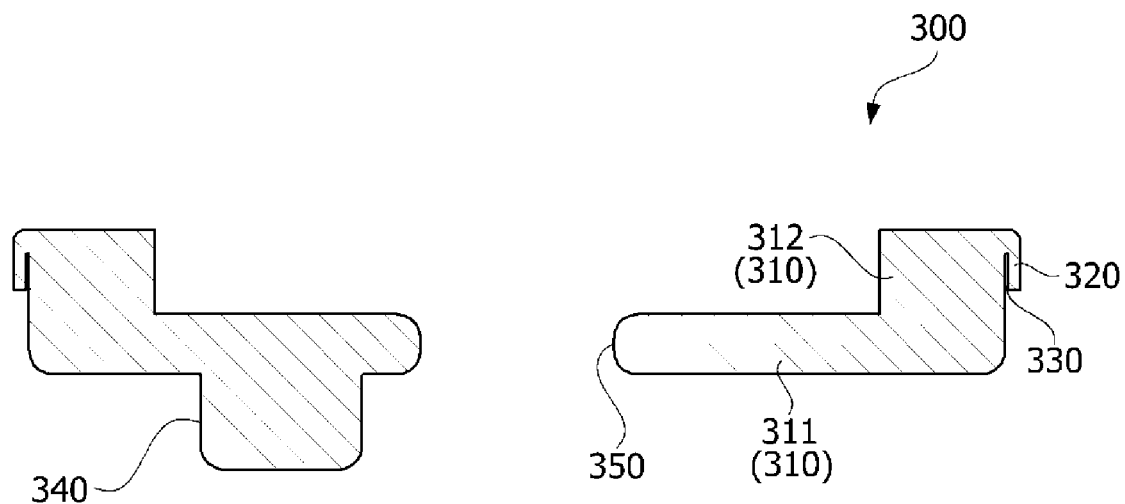
FIG. 8 is a cross-sectional view taken along line A-A of the cover shown in FIG. 6.

Referring to FIG. 6 to FIG. 8, the cover 300 may be provided on an upper part of the rotor core 100. The cover 300 may include a body part 310, a protrusion 320, the groove 330, and a coupling protrusion 340. The body part 310, the protrusion 320, the groove 330, and the coupling protrusion 340 may be separately described according to only their shapes and functional characteristics, but they may form one connected configuration.

The body part 310 may be implemented in a ring-shaped plate shape. The body part 310 may be divided into a base part or base 311 and a sidewall part or sidewall 312. The base part 311 is formed in a disc shape, and a through-hole 350 through which the rotating shaft 30 passes may be formed in the center of the base part. The sidewall part 312 may be formed at a circumference of the base part 311. With respect to the center C, an outer diameter of the sidewall part 312 may be formed to be smaller than an inner diameter of the insertion portion 420 of the can member 400 because the sidewall part 312 may be located inside the insertion portion 420.

The protrusion 320 may protrude from the outside of an upper end of the sidewall part 312 in a radial direction with respect to the center C. An outer diameter of the protrusion 320 may be formed to be greater than an outer diameter of the insertion portion 420 of the can member 400 so that the insertion portion 420 of the can member 400 may be inserted into the groove 330 formed in the protrusion 320.

The groove 330 may be concavely formed in a lower surface of the protrusion 320. The groove 330 may provide a space into which the insertion portion 420 of the can member 400 may be inserted. While the insertion portion 420 of the can member is inserted into the groove 330, the groove 330 may fix the can member 400 to the cover 300.

The coupling protrusion 340 may be inserted into a hole 110 of the rotor core 100 and may serve to couple the rotor core 100 to the cover 300. The coupling protrusion 340 may be formed at a lower surface of the base part 311 to protrude therefrom. The coupling protrusion 340 may be formed in a cylindrical shape, and may be formed in a shape with a round front end for easy insertion. A size of the coupling protrusion 340 may be set such that the coupling protrusion 340 may be inserted into a hole 110 (refer to FIG. 3) of the rotor core 100.

Figure 9:
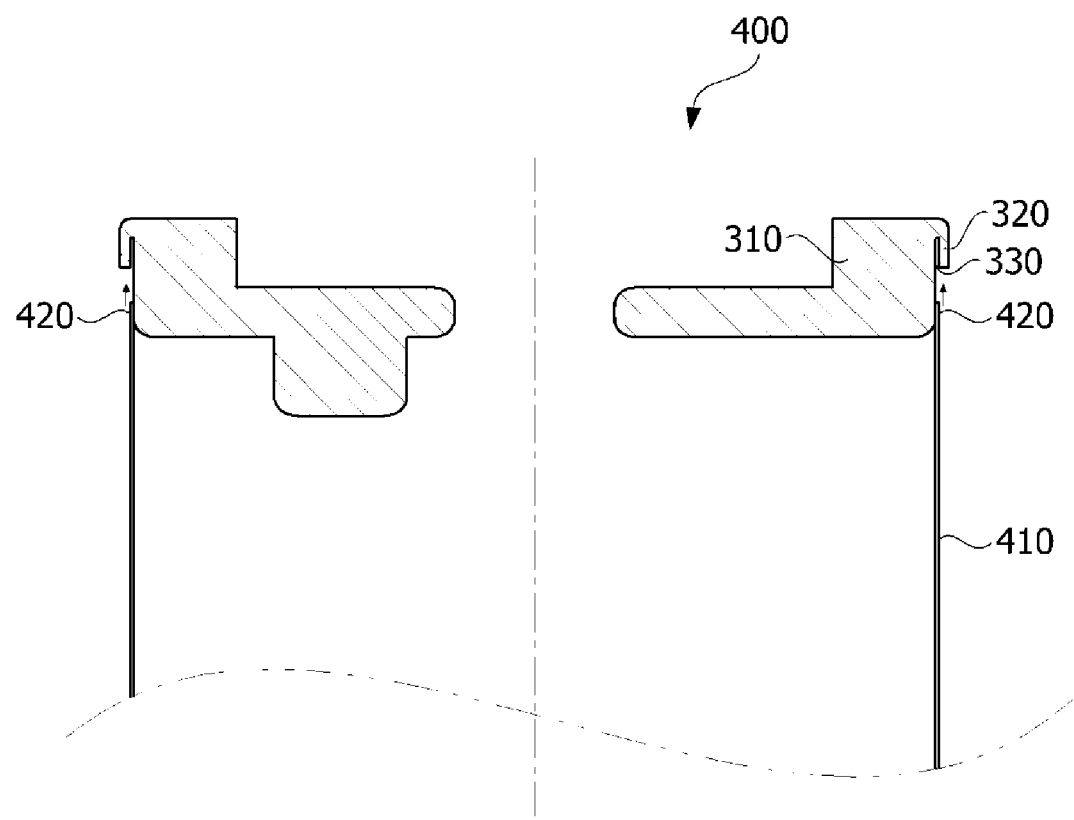
FIG. 9 is a view illustrating the insertion portion of the can member inserted into a groove of the cover.
Figure 10:
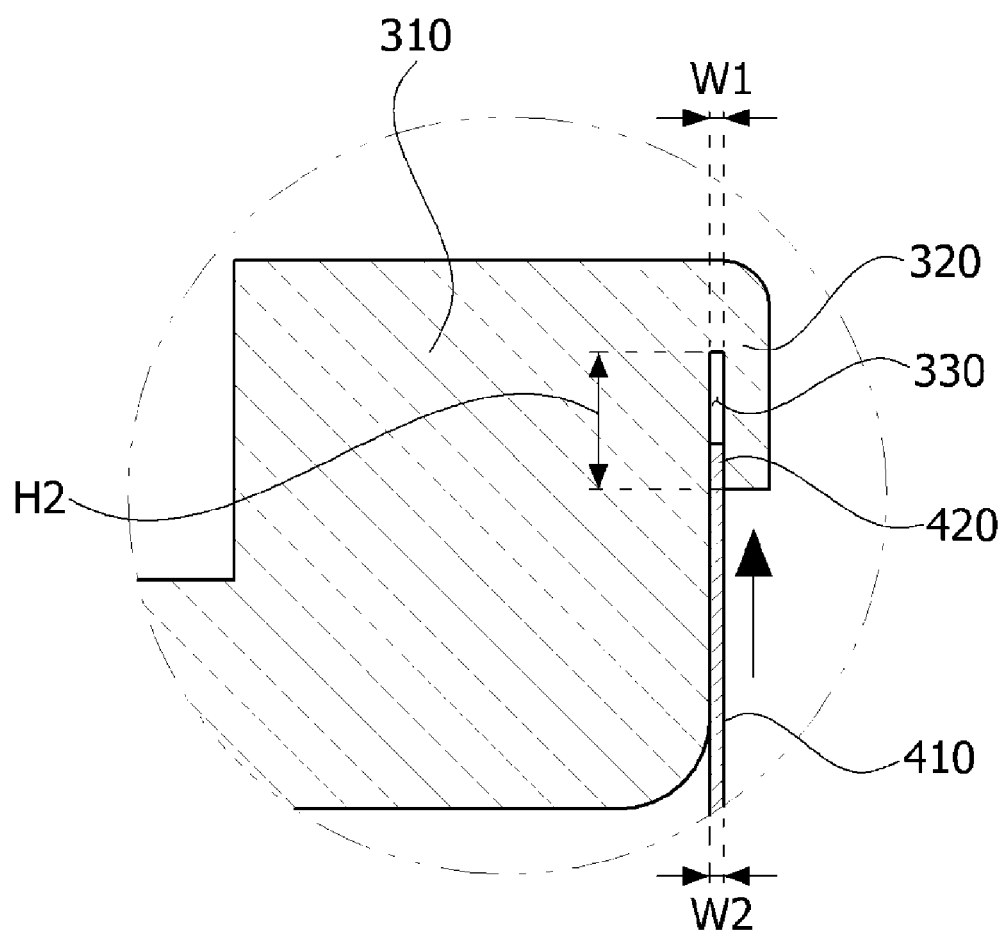
FIG. 10 is a view illustrating a thickness of the groove of the cover and a thickness of the insertion portion of the can member.

Referring to FIG. 9 and FIG. 10, the body part 310 of the cover 300 may slide along an inner surface of the insertion portion 420 of the can member 400 so that the insertion portion 420 may be inserted into the groove 330. A width W1 of the groove 330 may be set in consideration of a width W2 of the insertion portion 420 in order for the insertion portion 420 to be inserted into the groove 330. A length H2 of the groove 330 may also be set in consideration of the length H1 (refer to FIG. 5) of the insertion portion 420.

Figure 11:
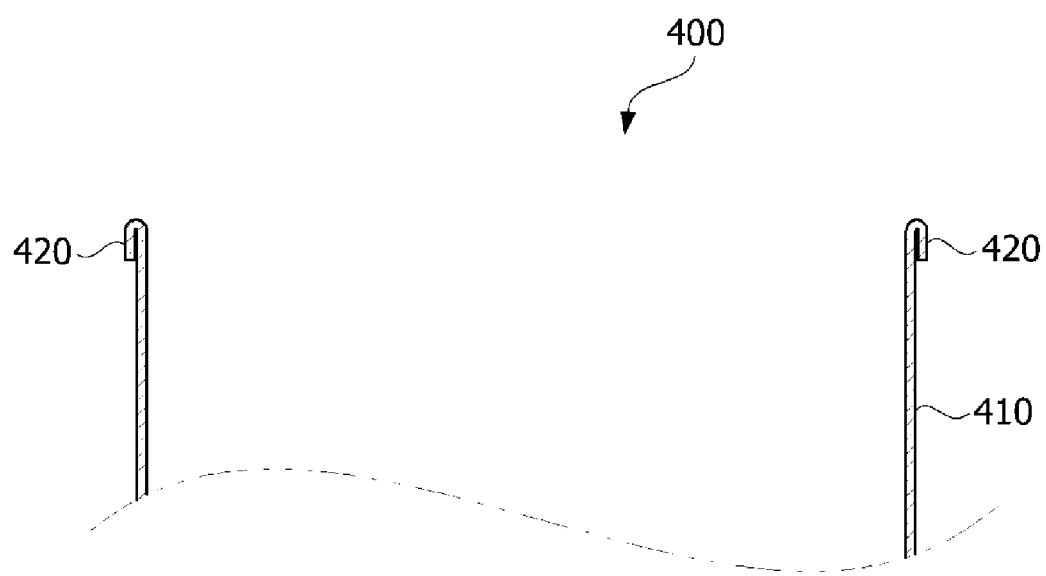
FIG. 11 is a view illustrating an edge of the insertion portion formed to be bent.

Referring to FIG. 11, an edge of the insertion portion 420 may be formed to be bent. The edge of the insertion portion 420 that is initially inserted into the groove 330 may be formed to be bent, and a curved surface may be implemented at a front end of the insertion portion 420. This configuration of the insertion portion 420 may prevent the edge of the insertion portion 420 from being caught on the groove 330 while the insertion portion is inserted into the groove 330.

Figure 12:
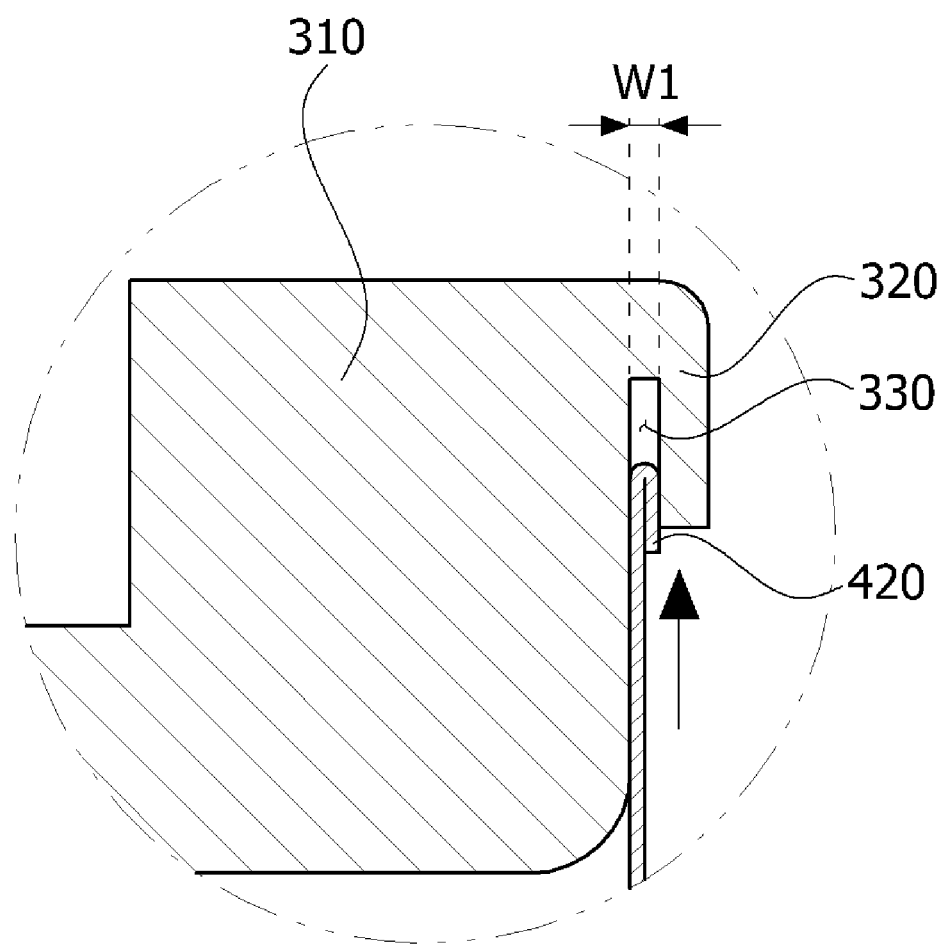
FIG. 12 is a view illustrating the insertion portion shown in FIG. 11 inserted into the groove.

Referring to FIG. 12, the edge of the insertion portion 420 in a bent state may be inserted into the groove 330. Unlike a sharpened edge of the insertion portion 420, a curved surface may be formed at an entering front end of the insertion portion 420 when the edge of the insertion portion 420 is bent, and therefore the cover 300 and the can member 400 may be readily assembled. The width W1 of the groove 330 may be suitably set or predetermined in consideration of a width of the bent edge of the insertion portion 420.

Figure 13:
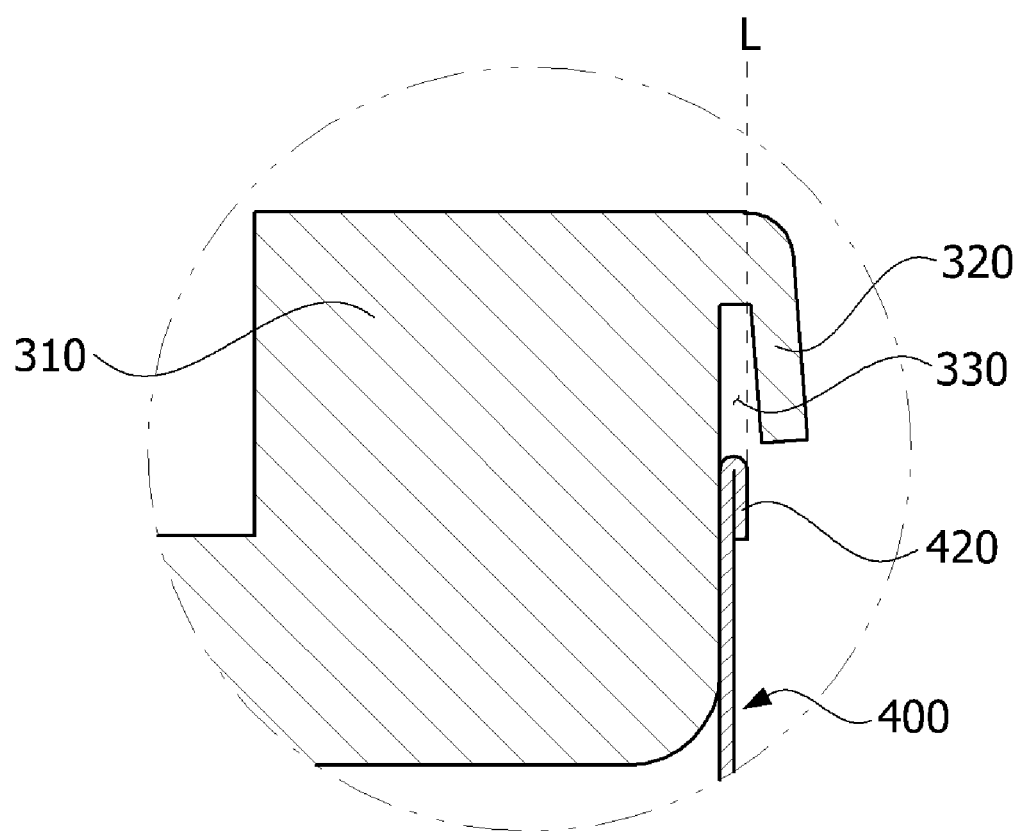
FIG. 13 is a view illustrating the groove and an approach angle of the insertion portion of the can member.

Referring to FIG. 13, an entrance of the groove 330 may be enlarged so that the insertion portion 420 of the can member 400 may be smoothly inserted into the groove 330. For example, when L of FIG. 13 is a reference line with respect to the width of the bent edge of the insertion portion 420, wherein the edge is formed at an outer circumferential surface of the body part 310 of the cover 300, an inner wall forming the groove 330 may be obliquely formed with respect to L. That is, a side of the entrance of the groove 330 may be enlarged to induce the insertion portion 420 to be readily inserted into the groove 330.

According to embodiments disclosed herein, an edge of a can member may be inserted into a groove of a cover to be coupled to the cover, and thus use of an adhesive may be avoided when the can member is coupled to a rotor core. Because the edge of the can member may be coupled to the groove of the cover without an additional process, manufacturing processes and manufacturing costs may be reduced.

A configuration, in which the can member may be bent and inserted into the groove of the cover, may be provided to prevent the edge of the can member from being caught on the groove while the edge of the can member is being inserted into the groove, and thus, the can member may be readily coupled to the cover. Embodiments disclosed herein provide a rotor capable of avoiding use of an adhesive and reducing the number of cans, and a motor having the same.

According to embodiments disclosed herein, a rotor may include a rotor core, a cover provided on an upper part of the rotor core, a magnet provided on an outer circumferential surface of the rotor core, and a can member which accommodates the rotor core and the magnet therein and is coupled to the cover, wherein the cover may include a groove which is formed in a circumferential direction with respect to the center of the cover and into which an edge of the can member may be inserted.

The cover may include a body part and a protrusion protruding from an outer circumferential surface of the body part, and the groove may be concavely formed in a lower surface of the protrusion. The body part may include a base part having a circular shape and a sidewall part formed at a circumference of the base part, wherein the protrusion may be formed to protrude outward from the sidewall part. The protrusion may be formed at an upper end of the sidewall part. The base part may include a through-hole which is formed at the center of the base part and through which a rotating shaft passes.

The rotor core may include a hole formed at one side of the rotor core, and the base part may include a coupling protrusion which protrudes from a lower surface of the base part to be coupled to the hole. An outer diameter of the base part may be formed to be smaller than an inner diameter of the can member, and an outer diameter of the protrusion may be formed to be greater than an outer diameter of the can member.

The can member may include a body which surrounds the outer circumferential surface of the rotor core and a flange part which is formed to be bent inward from an edge of any one side of the body. A height of the can member may be formed to be greater than a height of the rotor core. An edge of the other side of the body may be formed to be bent. The body may include an insertion portion which is formed by the edge of the other side being bent. An inner wall of the groove may be formed to be inclined to the outside. The can member may be coupled only to the cover.

According to embodiments disclosed herein, a motor may include a rotor including a rotor core, a cover provided on an upper part of the rotor core, a magnet provided on an outer circumferential surface of the rotor core, and a can member which accommodates the rotor core and the magnet therein and is coupled to the cover, wherein the cover may include a groove which is formed in a circumferential direction with respect to the center of the cover and into which an edge of the can member may be inserted, a stator provided outside of the rotor, and a rotating shaft coupled to the rotor core.

The stator may include coils and a busbar which may be connected to the coils and provided on the stator. A sensing magnet connecting to the rotating shaft may be included. The cover may include a body part and a protrusion protruding from an outer circumferential surface of the body part, and the groove may be concavely formed in a lower surface of the protrusion.

The body part may include a base part having a circular shape and a sidewall part formed in at a circumference of the base part, wherein the protrusion may be formed to protrude outward from the sidewall part. The protrusion may be formed at an upper end of the sidewall part. The base part may include a through-hole which may be formed at the center of the base part and through which a rotating shaft passes.

The can member may include a body which surrounds the outer circumferential surface of the rotor core and a flange part which may be formed to be bent inward from an edge of any one side of the body.

According to embodiments disclosed herein, a rotor may include a rotor core, a magnet which may be directly coupled to an outer circumferential of the rotor core, a cover which may be coupled to an upper part of the rotor core, and a can member which may be coupled only to the cover and accommodate the magnet and the rotor core.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rotor comprising:
a rotor core that includes at least one hole which is formed in a longitudinal direction of the rotor core;
a cover disposed on the rotor core, the cover being formed in a circumferential direction with respect to a center of the cover;
a magnet disposed on an outer circumferential surface of the rotor core; and
a can member disposed outside the rotor core and the magnet and configured to accommodate the rotor core and the magnet therein,
wherein the cover is coupled to the can member, wherein the cover includes:
a body part having a shape of a ring-shaped plate,
a protrusion configured to protrude, in a radial direction with respect to the center of the cover, from an outer circumferential surface of the body part,
a groove that is concavely formed in a lower surface of the protrusion, the groove to receive an upper edge of the can member, and at least one coupling protrusion that protrudes from a lower surface of the body part and is coupled to the at least one hole of the rotor core.

2. The rotor of claim 1, wherein the body part includes:
a base having a circular shape; and
a sidewall formed on an upper surface of the base,
wherein the protrusion is formed to protrude outward from an outer side of the sidewall.

3. The rotor of claim 1, wherein the base includes a through-hole which is formed at a center of the base and through which a rotating shaft passes.

4. The rotor of claim 1, wherein:
an outer diameter of the base is formed to be smaller than an inner diameter of the can member with respect to the center of the cover; and
an outer diameter of the protrusion is formed to be greater than an outer diameter of the can member.

5. The rotor of claim 1, wherein the can member includes:
a can body in a cylindrical shape that surrounds the outer circumferential surface of the rotor core; and
a flange which is formed to be bent inward from an edge of any one side of the body.

6. The rotor of claim 5, wherein a height of the can member is formed to be greater than a height of the rotor core.

7. The rotor of claim 5, wherein an edge of another side of the can body is formed to be bent.

8. The rotor of claim 7, wherein the can body includes an insertion portion formed by the edge of the other side being bent.

9. The rotor of claim 1, wherein a width of the groove is formed to increase in a downward direction.

10. The rotor of claim 1, wherein the can member is coupled only to the cover.

11. A motor comprising:
a rotating shaft;
the rotor of claim 1, the rotor including a coupling hole in which the rotating shaft is provided; and
a stator provided outside the rotor.

12. A rotor comprising:
a rotor core;
a cover disposed on the rotor core, the cover being formed in a circumferential direction with respect to a center of the cover;
a magnet disposed on an outer circumferential surface of the rotor core; and
a can member disposed outside the rotor core and the magnet and configured to accommodate the rotor core and the magnet therein,
wherein the cover is coupled to the can member and includes a groove into which an edge of the can member is inserted, wherein the cam member includes:
a can body in a cylindrical shape that surrounds the outer circumferential surface of the rotor core,
an insertion portion that extends from an upper edge of the can body, and
a flange that is bent inward from a lower edge of the can body,
wherein the insertion portion includes a first part, a curved part, and a second part, the first part to extend in a first axial direction from the upper edge of the can body to the curved part, and the second part to extend from the curved part in a second axial direction that is opposite from the first axial direction,
wherein an inner diameter of the first part of the insertion portion with respect to the center of the cover is same as an inner diameter of the can body with respect to the center of the cover.

13. The rotor of claim 12, wherein the cover includes:
a body part having a shape of a ring-shaped plate,
a protrusion configured to protrude, in a radial direction with respect to the center of the cover, from an outer circumferential surface of the body part,
the groove that is concavely formed in a lower surface of the protrusion, and
at least one coupling protrusion that protrudes from a lower surface of the body part and is coupled to at least one hole of the rotor core.

14. The rotor of claim 13, wherein the body part includes:
a base having a circular shape, and
a sidewall formed on an upper surface of the base,
wherein the protrusion is formed to protrude outward from an outer side of an upper end of the sidewall.

15. The rotor of claim 13, wherein the base includes a through-hole which is formed at a center of the base and through which a rotating shaft passes.

16. A motor comprising:
a rotating shaft;
the rotor of claim 12, the rotor including a coupling hole in which the rotating shaft is provided; and
a stator provided outside the rotor.

* * * * *